(12) United States Patent
Yagioka et al.

(10) Patent No.: US 6,989,494 B2
(45) Date of Patent: Jan. 24, 2006

(54) SCALE WITH MEMORY DISPLAY FUNCTION

(75) Inventors: Satoshi Yagioka, Tokyo (JP); Junko Sekiguchi, Soka (JP)

(73) Assignee: Tanita Corporation, Tokyo (JP)

( * ) Notice: Subject to any disclaimer, the term of this patent is extended or adjusted under 35 U.S.C. 154(b) by 195 days.

(21) Appl. No.: 10/336,788

(22) Filed: Jan. 6, 2003

(65) Prior Publication Data

US 2003/0127254 A1 Jul. 10, 2003

(30) Foreign Application Priority Data

Jan. 10, 2002 (JP) ........................ 2002-003001

(51) Int. Cl.
*C30B 15/00* (2006.01)

(52) U.S. Cl. ................. 177/25.13; 177/25.19; 702/173

(58) Field of Classification Search ... 177/25.11–25.19; 702/173
See application file for complete search history.

(56) References Cited

U.S. PATENT DOCUMENTS

| 4,301,879 A | | 11/1981 | Dubow ........................ 177/5 |
| 4,423,792 A | | 1/1984 | Cowan .................... 177/25.19 |
| 4,773,492 A | | 9/1988 | Ruzumna ................ 177/25.19 |
| 4,992,929 A | * | 2/1991 | Yamada et al. .............. 700/84 |
| 5,084,832 A | * | 1/1992 | Yamada et al. ............. 702/173 |
| 5,121,328 A | * | 6/1992 | Sakai et al. ................. 705/407 |
| 5,589,670 A | * | 12/1996 | Berli ....................... 177/25.13 |
| 6,353,192 B1 | * | 3/2002 | Thiel ...................... 177/25.15 |
| 6,674,019 B2 | * | 1/2004 | Oldendorf et al. ....... 177/25.13 |

FOREIGN PATENT DOCUMENTS

| CN | 2096747 U | | 2/1992 |
| CN | 2371552 Y | | 3/2000 |
| DE | 200 20 198 | | 5/2001 |
| FR | 2 564 196 | | 11/1985 |
| FR | 2564196 | * | 11/1985 |
| GB | 2 350 433 | | 11/2000 |
| GB | 2 350 435 A | | 11/2000 |
| GB | 2350435 | * | 11/2000 |
| JP | 05-288596 | * | 11/1983 |
| JP | 58-215515 | * | 12/1983 |
| JP | S59-109828 | * | 6/1984 |
| JP | 59 109828 | | 6/1984 |
| JP | 05 288 596 | | 11/1993 |
| JP | 05-288596 | | 11/1993 |
| JP | 2000-292248 | * | 10/2000 |
| JP | P2000-292248 A | | 10/2000 |
| JP | 2001-317990 | * | 11/2001 |
| JP | P2001-317990 A | | 11/2001 |

* cited by examiner

*Primary Examiner*—Randy W. Gibson
(74) *Attorney, Agent, or Firm*—McDermott Will & Emery LLP

(57) ABSTRACT

A scale equipped with a memory display section comprises, separately from a regular display section 19 for indicating a current measured value, additionally a memory display section 20 for indicating the current measured value as a previously measured value in a series of consecutive measurements, wherein a transfer unit 22 executes such a transfer operation that the current measured value indicated in the regular display section 19 can be indicated in the memory display section 20 as the previously measured value in a series of consecutive measurements. A person in charge of measurement no more needs to take the trouble of remembering in the brain or taking notes of the previously measured values in a series of consecutive measurements, such as an incremental measurement, but the current measuring work can be carried out simply by a visual recognition.

14 Claims, 6 Drawing Sheets

SCALE WITH MEMORY DISPLAY FUNCTION

BACKGROUND OF THE INVENTION

1. Field of the Invention

The present invention relates to a scale equipped with a memory display function, which allows, in a series of consecutive measurements, a measured value to be memory-displayed in a memory display section separately from a regular display section.

2. Description of the Prior Art

A display section of a scale for indicating a measured value, in a prior art technology, only indicates a measured value of an object being currently measured. A person in a continuous measurement, for example, in an incremental measurement, has to remember in his/her brain or take notes for recording each one of the measured values at each time of measurement so as to carry out such a series of measurements.

However, there has been a drawback in a practice according to the prior art technology, in that if any of the measured values remembered in the brain were accidentally forgotten, the whole course of measurement has to be done again or that picking up a pen to take notes of measured values at each time of measurements produces inevitably extra works.

In the light of the above facts, the present invention has been made to solve the problems pertaining to the prior art technology and an object thereof is to provide a scale equipped with a memory display function that can reduce effort of a person in carrying out a series of measurements such as an incremental measurement.

SUMMARY OF THE INVENTION

In order to achieve the object described above, a scale equipped with a memory display function according to the present invention is characterized in comprising: a regular display section for indicating a current measured value; and a memory display section for indicating said current measured value indicated in said regular display section as a previously measured value in a series of consecutive measurements. According to this aspect of the present invention, since the scale is equipped with the regular display section and the memory display section, the person in the course of consecutive measurement no more needs to take the trouble, such as remembering in the brain or taking notes of measured values, but he/she can carry out a current measurement work by way of visual recognition without any additional effort.

Said scale according to the present invention is further characterized in comprising a plurality of said memory display sections. According to this aspect of the present invention, which enables a simultaneous recognition of a plurality of previously measured values in a series of consecutive measurements such as an incremental measurement, the current measurement work can be carried out with an extended permissible range of no effort required.

Said scale according to the present invention is further characterized in further comprising: a summing unit, wherein said summing unit determines a total measured value from a current measured value indicated in said regular display section and a previously measured value in a series of consecutive measurements as indicated in said memory display section, and wherein said total measured value determined in said summing unit is indicated in either one of said regular display section or said memory display section. In this aspect of the present invention, the person in measuring work can recognize a determined total measured value without his/her own effort of calculation, thereby facilitating a convenient way of measurement without any trouble.

Said scale according to the present invention is further characterized in further comprising a transfer unit, wherein said transfer unit transfers a measured value indicated in said regular display section so that it can be indicated in said memory display section as a previously measured value in a series of consecutive measurements. According to this aspect of the present invention, since the scale comprises the transfer unit, it is ensured that the measured value indicated in the memory display section represents the previously measured value in the series of consecutive measurements, such as an incremental measurement, thereby providing an easy recognition.

Said scale according to the present invention is further characterized in that said regular display section, after the measured value having been transferred by said transfer unit, indicates a tared value. According to this aspect of the present invention, since the regular display section, after the measured value having been transferred therefrom by the transfer unit, indicates the tared value defined by subtracting a tare weight value from the measured value, an additional object to be measured can be loaded on a loading table and a measured value for this additional object to be measured can be obtained in a continuous manner yet with no effort without making such a troublesome work of removing the previously measured object from a loading table of the scale.

Said scale according to the present invention is further characterized in that, if said regular display section indicates either "0" or "a negative value", said transfer unit executes no transfer operation to indicate said measured value in said memory display section as a previously measured value in a series of consecutive measurements. According to this aspect of the present invention, since in case of "0" or "a negative value" indicated in the regular display section, the value would not be transferred by the transfer unit to the memory display section, therefore it is ensured that only the measured value acquired in a measurement for an object actually loaded on the loading table can be transferred into the memory display section.

Said scale according to the present invention is further characterized in that said transfer unit comprises: a manual transfer switch for a manual input upon executing a transfer operation; and a manual transfer control section which, in response to an input to said manual transfer switch, controls the transfer operation to be executed so that a measured value indicated in said regular display section may be indicated in said memory display section as a previously measured value in a series of consecutive measurements. According to this aspect of the present invention, since the transfer unit comprises the manual transfer switch and the manual transfer control section, therefore based on the determination by the person in charge of the measurement, only the necessary measured value at each measurement can be transferred to the memory display section.

Said scale according to the present invention is further characterized in that said transfer unit comprises: a clock section for clocking the time; and an automatic transfer control section which, after an elapse of a predetermined time, as clocked in said clock section, while the measured value indicated in said regular display section being held unchanged, controls the transfer operation to be executed so that a measured value indicated in said regular display section may be transferred to and indicated in said memory display section as a previously measured value in a series of consecutive measurements. According to this aspect of the present invention, since the transfer unit comprises the clock section and the automatic transfer control section, therefore the measured value can be transferred to the memory display section without causing the person in measurement to take the trouble of executing the operation.

Said scale according to the present invention is further characterized in further comprising a tare subtraction unit, wherein said tare subtraction unit subtracts a weight equivalent to a tare from a measured value indicated in said regular display section. According to this aspect of the present invention, since the tare subtraction unit subtracts the weight equivalent to the tare from the measured value to be indicated in the regular display section, therefore the measurements in a continuous manner can be carried out while eliminating those particular measured values which need not be transferred to the memory display section. In addition, the measurements in a continuous mode can be carried out without sequentially adding the objects to be measured onto the loading table.

DESCRIPTION OF THE PREFERRED EMBODIMENTS

Preferred embodiments of the present invention will now be described with reference to the attached drawings.

Figure 1:
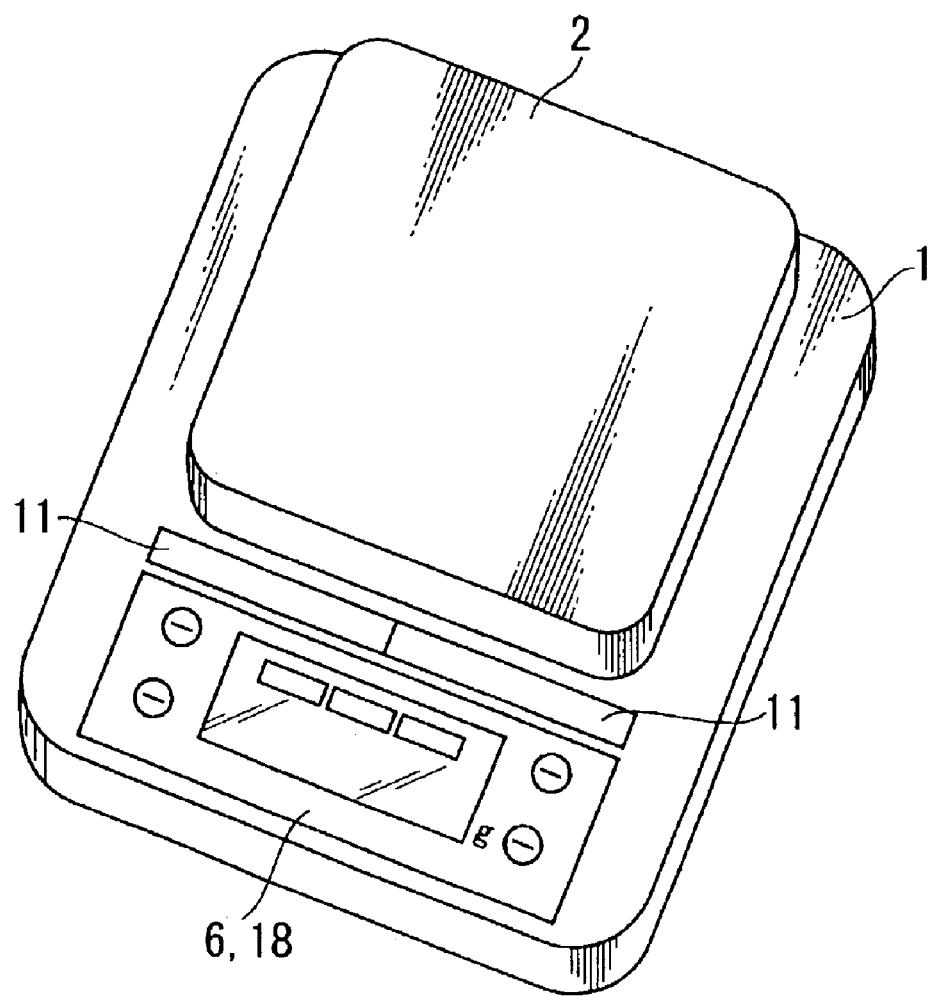
FIG. 1 is a perspective view showing an overview of a scale equipped with a memory display function according to the present invention.
Figure 2:
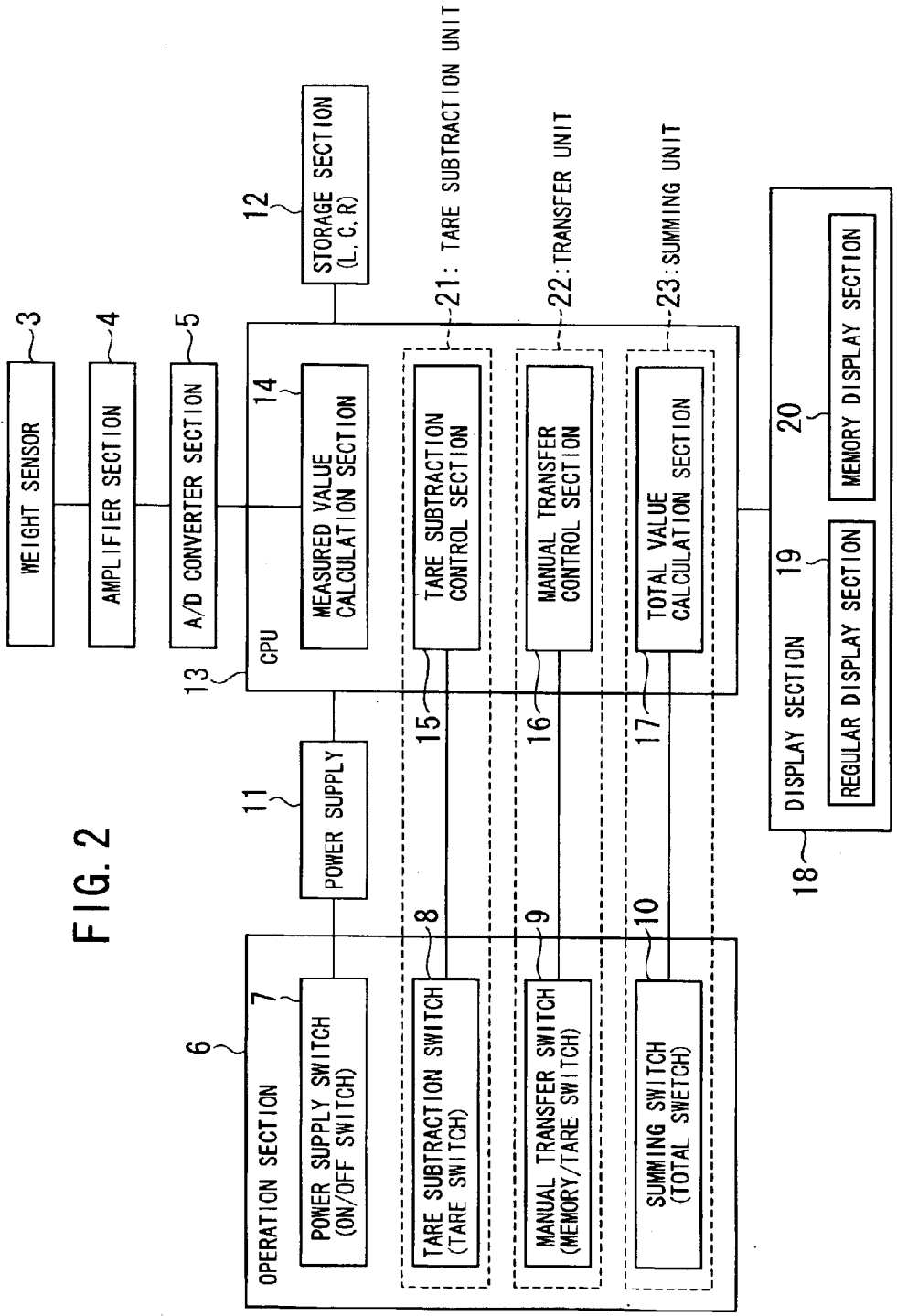
FIG. 2 is a block diagram illustrating a configuration of a scale equipped with a memory display function according to the present invention.
Figure 3:
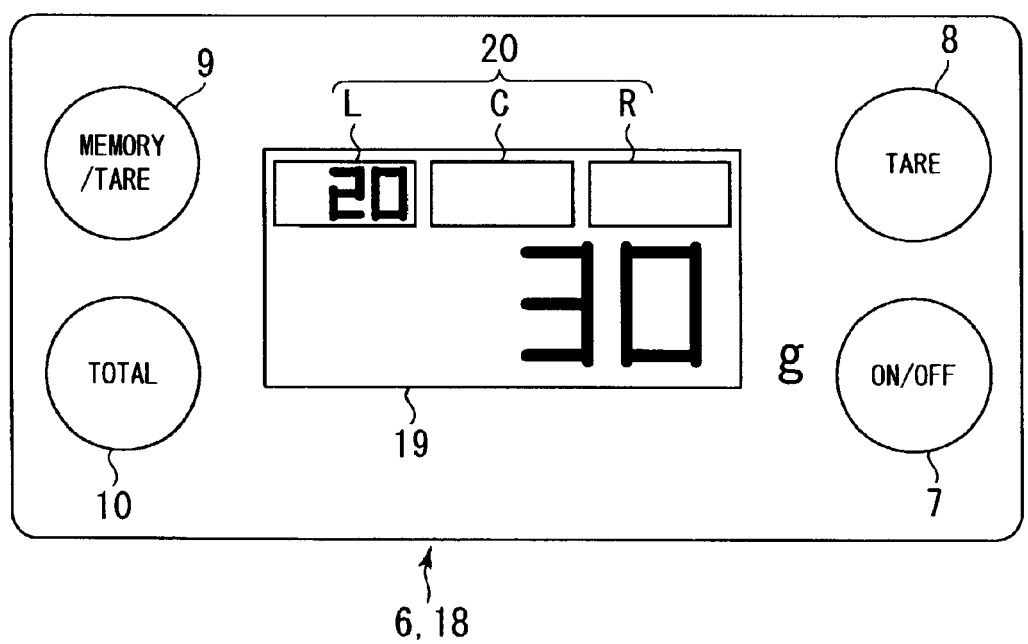
FIG. 3 is a detailed view showing details of a display section and an operation section of a scale equipped with a memory display function according to the present invention.

First of all, a configuration of a scale equipped with a memory display function according to the present invention will be described in detail with reference to the attached drawings of FIGS. 1 through 3, in which FIG. 1 is a perspective view showing an overview of a scale equipped with a memory display section according to the present invention, FIG. 2 is a block diagram illustrating a configuration thereof, and FIG. 3 is a detailed view showing details of a display section and an operation section thereof.

A scale equipped with a memory display function according to the present invention comprises a case 1 forming an exterior package and a loading table 2 on which an object to be measured is to be placed, both together constructing a principle profile of the scale. In addition, the case 1 includes an operation section 6, a display section 18 and power supplies 11 disposed in a front part of the case 1, and further, a weight sensor 3, am amplifier section 4, an A/D converter section 5, a storage section 12 and a CPU 13, each disposed in an inside of the case 1, which together construct an overall unit of the scale.

The weight sensor 3 receives a transmission of a load from the loading table 2 and converts it into an electric signal. The amplifier section 4 amplifies the analog signal from the weight sensor 3. The A/D converter section 5 converts the analog signal from the amplifier section 4 into a digital signal.

The power supplies 11, 11 are supply sources of electric power to respective components of an electric system, and in this embodiment, solar batteries may be used. It is to be noted that the power supply 11 may be implemented in the form of other power supply, for example, a dry battery, an AC adapter and so on.

The display section 18 indicates respective results such as measured values. The display section 18 comprises a regular display section 19 for indicating a current measured value or a total measured value and a plurality (three) of memory display sections (L,C,R) 20 for indicating previously measured values in a series of consecutive measurements. It is to be noted that the regular display section 19 may also indicate the measured value subtracted by a weight equivalent to a tare after the measured value having been transferred by a transfer unit 22, which will be described later.

The operation section 6 serves as a section for executing operations for a variety of functions. The operation section 6 comprises: a power supply switch (ON/OFF switch) 7 for supplying the electric power from the power supplies 11, 11 to respective components of the electric system; a tare subtraction switch (TARE switch) 8 for subtracting the weight equivalent to the tare from the measured value to be indicated in the regular display section 19; a manual transfer switch (MEMORY/TARE switch) 9 for transferring the measured value indicated in the regular display section 19 such that said measured value may be indicated in the memory display section 20 as the previously measured value in a series of consecutive measurement; and a summing switch (TOTAL switch) 10 for summing up the current measured value indicated in the regular display section 19 and the previously measured values in the series of consecutive measurements as indicated in the memory display sections 20.

The storage sections (such as L, C and R) 12 store various data, such as previously measured values in the series of consecutive measurements as indicated in the memory display sections (L, C and R) 20.

The CPU 13 executes controls and arithmetic operations for respective components. The CPU may comprise: a measured value calculation section 14 for calculating the measured value based on the digital signal from the A/D converter section 5; a tare subtraction control section 15 for controlling a subtracting operation of the weight equivalent to the tare from the current measured value or the total measured value indicated in the regular display section 19; a manual transfer control section 16, which in conjunction with an input to the manual transfer switch 9, controls the transfer operation to be executed so that the current measured value or the total measured value indicated in the regular display section 19 may be transferred and indicated in the memory display section 20 as the previously measured value in the series of consecutive measurements; a total value calculation section 17, which in conjunction with an input to the summing switch 10, calculates the total measured value from the current measured value indicated in the regular display section 19 and the previously measured values in the series of consecutive measurements as indicated in the memory display sections 20; and so on.

It is to be noted that the tare subtraction switch 8 and the tare subtraction control section 15 together construct a tare subtraction unit 21 for subtracting the weight equivalent to the tare from the current measured value or the total measured value indicated in the regular display section 19. Besides, the manual transfer switch 9 and the manual transfer control section 16 together construct a transfer unit 22 for transferring the measured value indicated in the regular display section 19 so that said measured value may be indicated in the memory display section 20 as the previously measured value in the series of consecutive measurements. In is to be noted that the transfer unit 22 would not execute any transfer operation when the regular display section 19 indicates either one of "0" or "a negative value". Further, the summing switch 10 and the total value calculation section 17 together construct a summing unit 23 for determining the total measured value from the previously measured values in the series of consecutive measurements as indicated in the memory display sections 20 and the current measured value indicated in the regular display section 19.

Figure 4:
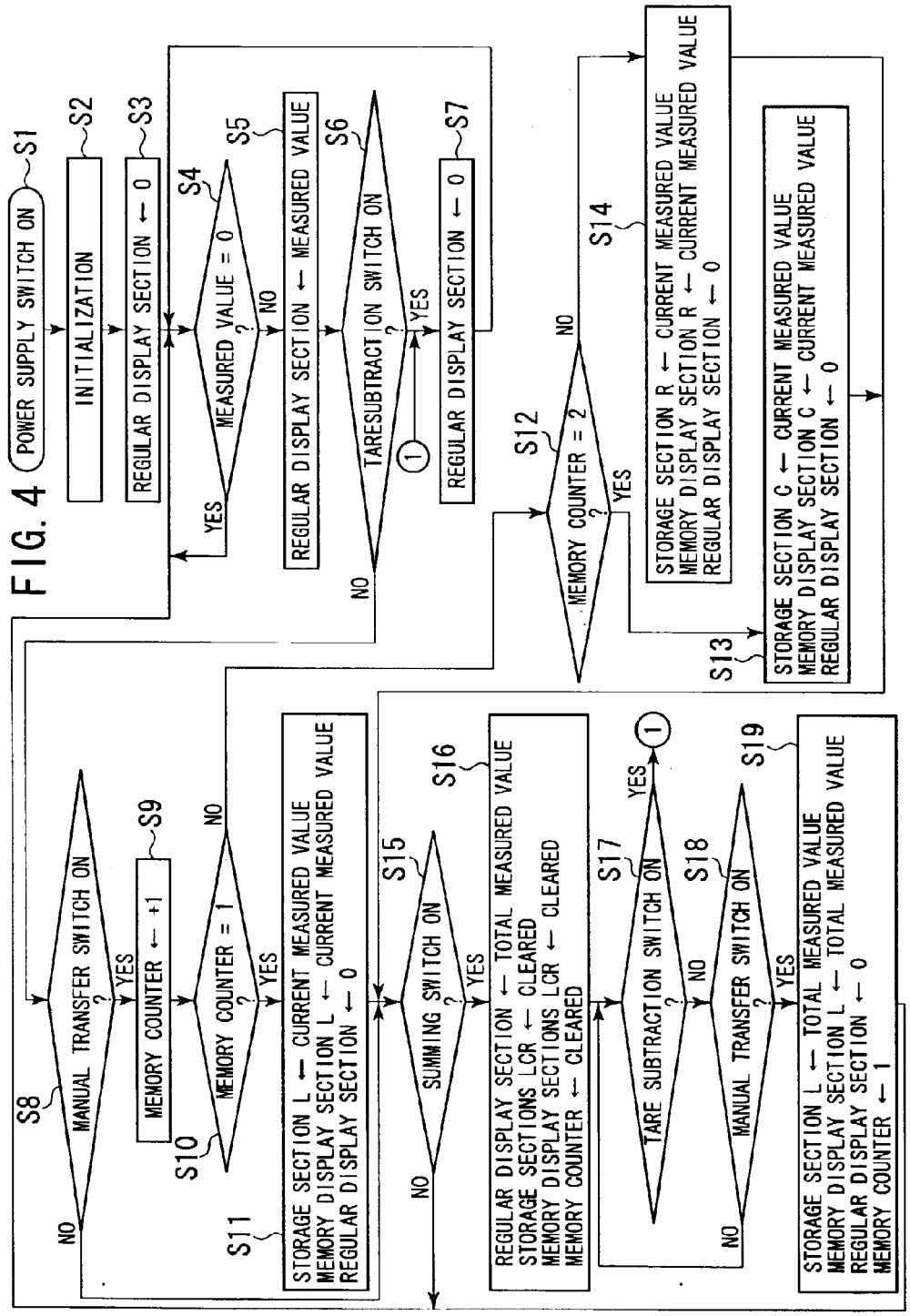
FIG. 4 is a flow chart illustrating an operation and a process flow of a scale equipped with a memory display function according to the present invention.
Figure 5A:
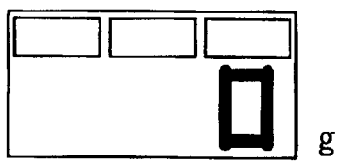
FIGS. 5A through 5J show some examples of indication appearing in a display section of a scale equipped with a memory display function according to the present invention.
Figure 5B:
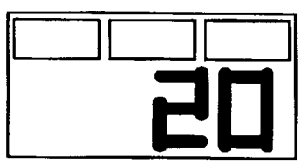
Figure 5C:
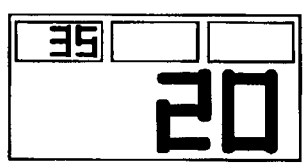
Figure 5D:
Figure 5E:
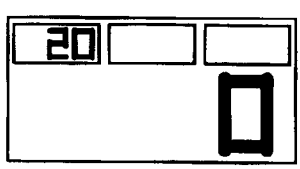
Figure 5F:
Figure 5G:
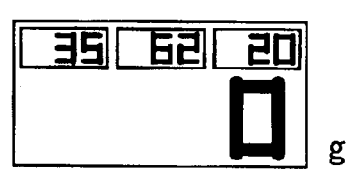
Figure 5H:
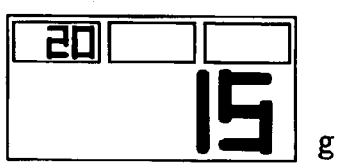
Figure 5I:
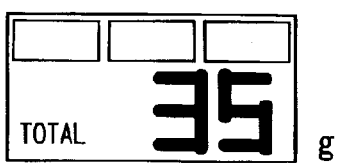
Figure 5J:
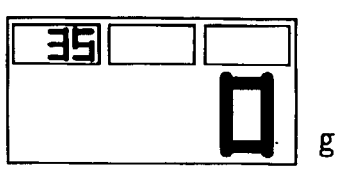

Secondly, an operation and a process of the scale equipped with the memory display function according to the present invention will be described in detail with reference to the attached drawings of FIGS. 4 and 5, in which FIG. 4 is a flow chart illustrating the operation and a process flow of the scale equipped with the memory display function according to the present invention, and FIGS. 5A through 5J show some examples of indication appearing thereupon in the display section.

For starting the operation, when the power supply switch 7 is turned on (Step 1 of FIG. 4), the power supplies 11, 11 supply the electric power to respective components of the electric system so as to initiate those components of the electric system (Step 2 of FIG. 4), and the regular display section 19 indicates "0" (Step 3 of FIG. 4 and FIG. 5A) showing the scale being ready for a measurement.

Subsequently, this condition is maintained until an object to be measured is placed on the loading table 2 (YES in Step 4 of FIG. 4). On one hand, when the object to be measured is placed on the loading table 2, the weight sensor 3 converts the load from the object to be measured into the analog signal, which is in turn amplified in the amplifier section 4, and this amplified analog signal is further converted into the digital signal in the A/D converter section 5, and then, based on this digital signal, the measured value calculation section 14 calculates the measured value to carry out the measurement of the object to be measured (NO in Step 4 of FIG. 4), so that a current measured value may be indicated in the regular display section 19 (Step 5 of FIG. 4 and FIG. 5B).

In next step, if the tare subtraction switch 8 is turned on while the regular display section is indicating the current measured value other than "0" (YES in Step 6 of FIG. 4), the tare subtraction control section 15 changes the current measured value indicated in the regular display section 19 to a tare subtracted value "0" (Step 7 of FIG. 4 and FIG. 5A), and then the process returns to Step 4 to repeat the similar operations as above.

On the other hand, if the tare subtraction switch 8 is not turned on during the regular display section 19 indicating the current measured value other than "0" (NO in Step 6 of FIG. 4) but instead the manual transfer switch 9 is turned on (YES in Step 8 of FIG. 4), then the memory counter in the CPU is incremented by "1" (Step 9 of FIG. 4). It is to be noted that if the regular display section 19 indicates "0" or "a negative value", Step 8 determines it as NO, and no increment takes place in the memory counter within the CPU even if the manual transfer switch 9 is turned on.

Subsequently, when the memory counter represents "1" (YES in Step 10 of FIG. 4), the current measured value indicated in the regular display section 19 is stored in the storage section (L) 12. Also, through the transfer control in the manual transfer control section 16, the current measured value indicated in the regular display section 19 is indicated in the memory display section (L) 20 as a previously measured value in a series of consecutive measurements. Then, the regular display section 19 after the transfer operation indicates "0" representing the tare subtracted value (Step 11 of FIG. 4 and FIG. 5E).

On the other hand, if this memory counter represents other than "1" (NO in Step 10 of FIG. 4), that is, when the measured value is indicated in the memory display section (L) 20 in the last time measurement as the previously measured value in a series of consecutive measurement (FIG. 5C), then it is further determined whether or not this memory counter represents "2" (Step 12 of FIG. 4).

If the memory counter indicates "2" (YES in Step 12 of FIG. 4), the current measured value indicated in the regular display section 19 is stored in the storage section (C) 12. Also, through the transfer control in the manual transfer control section 16, the current measured value indicated in the regular display section 19 is indicated in the memory display section (c) 20 as the previously measured value in a series of consecutive measurements. Then, the regular display section 19 after the transfer operation indicates "0" representative of the tare subtracted value (Step 13 of FIG. 4 and FIG. 5F).

On the other hand, if the memory counter represents other than "2" (NO in Step 12 of FIG. 4), that is, when the measured value is indicated in the memory display section (C) 20 in the last time measurement as the previously measured value in a series of consecutive measurement (FIG. 5D), then the current measured value indicated in the regular display section 19 is stored in the storage section (R) 12. Also, through the transfer control in the manual transfer control section 16, the current measured value indicated in the regular display section 19 is indicated in the memory display section (R) 20 as a previously measured value in a series of consecutive measurements. Then, the regular display section 19 after the transfer operation indicates "0" representing the tare subtracted value (Step 14 of FIG. 4 and FIG. 5G).

If the manual transfer switch 9 is not turned on (NO in Step 8 of FIG. 4) as well as after Step 11, 13 and 14, it is determined whether or not the summing switch 10 is turned on (Step 15 of FIG. 4).

If the summing switch 10 is not turned on (NO in Step 15 of FIG. 4), the process returns to Step 4 and repeats the operations in a similar manner. On the other hand, if the summing switch 10 is turned on (YES in Step 15 of FIG. 4), then the total value calculation section 17 calculates the total measured value from the current measured value indicated in the regular display section 19 and the previously measured values in a series of consecutive measurements as indicated in the memory display sections 20 (in this example, operation with respect to the example of display of FIG. 5H), and the regular display section 19 indicates the determined total measured value with indicative characters "TOTAL" (Step 16 of FIG. 4 and FIG. 5I). It is to be noted that at this time, those values stored in the storage section (L, C and R) 12, the previously measured values indicated in the memory display sections (L,C and R) 20 and the memory counter are all cleared.

Subsequently, if the tare subtraction switch 8 is turned on during the regular display section 19 indicating the total measured value (YES in Step 17 of FIG. 4), then the process returns to Step 7 and repeats the operations in a similar manner. On the other hand, if the tare subtraction switch 8 is not turned on (NO in Step 17 of FIG. 4) and also the manual transfer switch 9 is not turned on (NO in Step 18 of FIG. 4), then the process returns to Step 17 and repeats the operations in a similar manner.

Subsequently, if the manual transfer switch 9 is turned on (YES in Step 18 of FIG. 4), the total measured value indicated in the regular display section 19 is stored in the storage section (L) 12. Also, the memory counter is incremented by "1", and through the transfer control in the manual transfer control section 16, the total measured value indicated in the regular display section 19 is indicated in the memory display section (L) 20 as the previously measured value in a series of consecutive measurements. Then, the regular display section 19 after the transfer operation indicates "0" representative of the tare subtracted value (Step 19 of FIG. 4 and of FIG. 5J).

Thereafter, returning to Step 4, the process repeats the operations in a similar manner. It is to be noted that in the course of executing steps as discussed above, if the value indicated in the regular display section 19 is not changed in an elapse of a predetermined time, or if the power supply switch is turned off, then the power supply is shut down.

As described above, since the scale equipped with the memory display function according to the present invention comprises the memory display section (L, C and R) 20 separately from the regular display section 19, therefore in such a condition of measurement having additional objects placed sequentially on the loading table (i.e., an incremental measurement), the current measuring procedure can be carried out without taking notes while at the same time confirming the previously measured values, such as the last time measured value, the one before the last time measured value and so on.

More advantageously, since the scale equipped with the memory display function according to the present invention comprises the transfer unit 22 constitutive of the manual transfer switch 9 and the manual transfer control section 16, therefore the current measuring operation can be carried out while selecting only those specific ones required as the previously measured values in a series of consecutive measurements among the current measured values and total measured values with the aid of the manual transfer control section 16 actuated by the manual transfer switch 9. In addition, since those selected previously measured values in the series of consecutive measurements are exclusively indicated in the memory display sections (L, C and R) 20, it can be surely recognized that the indicated values are the previously measured values in a series of consecutive measurements. Further, since the regular display section 19 after the transfer operation indicates "0" representing the tare subtracted value, therefore the additional object to be measured can be placed on the loading table thus to continue to obtain the measured values of the additional object to be measured without unloading the previously measured object. Further, since in the case of indication of "0" or "a negative value", the transfer unit 22 would not execute the transfer operation to the memory display sections (L, C and R) 20, therefore it is ensured that only the measured value acquired when the object to be measured is actually placed on the loading table 2 can be transferred.

Further, since the summing unit 23 is provided, a person in charge of measurement no more needs to calculate by himself/herself but can recognize the total measured value of the current measured value indicated in the regular display section 19 and the previously measured values in a series of consecutive measurements as indicated in the memory display sections (L, C and R) 20.

Still further, since the tare subtraction unit 21 is provided, a series of consecutive measurements can be carried out, while eliminating those particular values indicated in the regular display section 19 that have no need to be transferred to the memory display section 20. Yet further, a series of consecutive measurements can be carried out without adding the objects to be measured onto the loading table in a sequence manner.

It is to be noted that in the above embodiment, three memory display sections 20 are used for indicating the previously measured values in a series of consecutive measurements but only one memory display section may be employed. Alternatively, by increasing the number of memory display sections to be provided, a series of consecutive measurements may be facilitated more without the trouble of taking notes of measured values. This can be achieved by increasing the number of storage sections 12 corresponding to the number of memory display sections 20 so as to execute the similar operations.

Further, although in the above description, the total measured value summed up by the summing unit 23 is indicated in the regular display section 19, the total measured value may be indicated in the memory display section 20 or both of the regular display section 19 and the memory display section 20.

Figure 6:
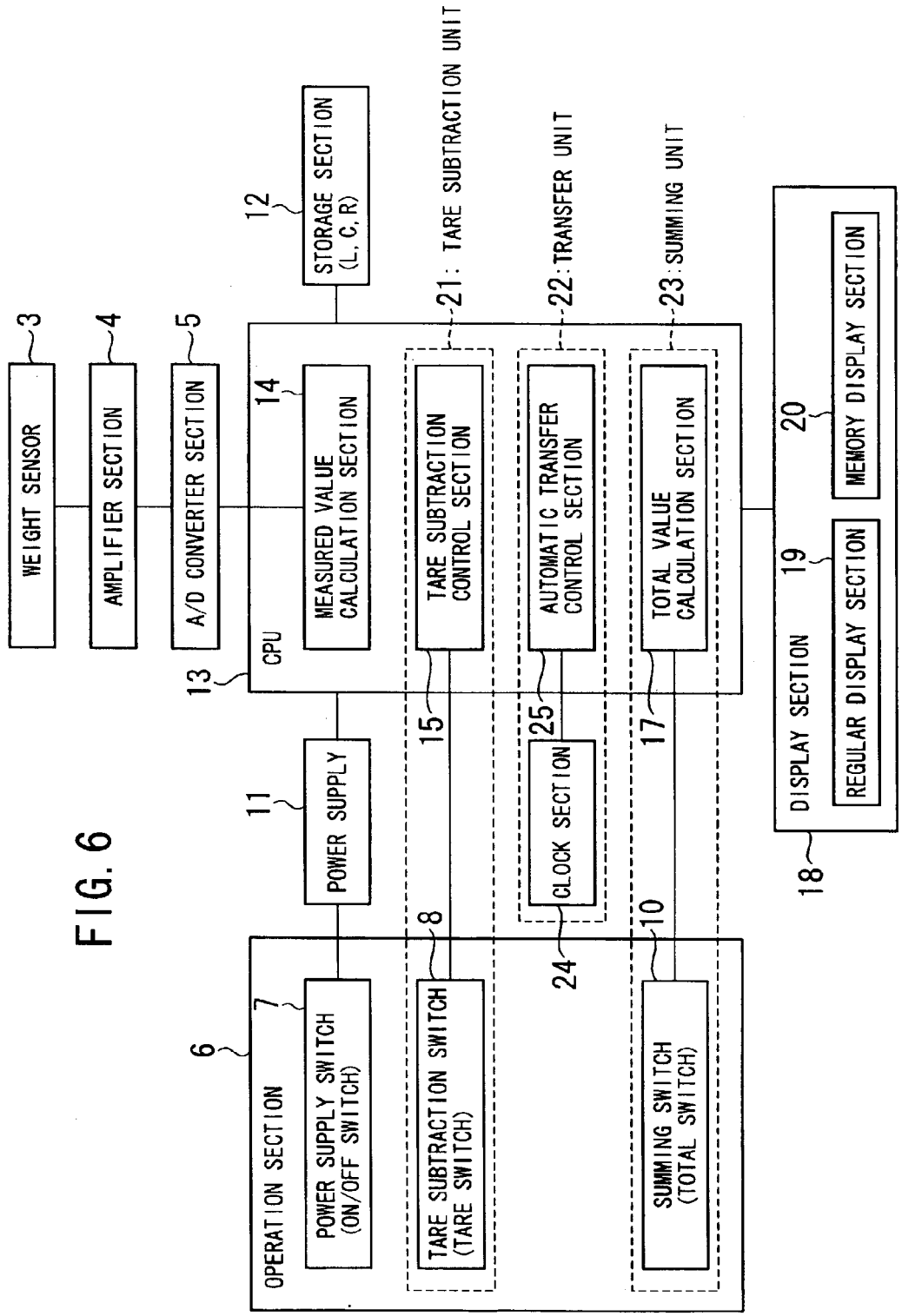
FIG. 6 is a block diagram illustrating an alternative configuration of a scale equipped with a memory display function according to the present invention.

Still further, as shown in block diagram of FIG. 6, the transfer unit 22 may be made of a clock section 24 and an automatic transfer control section 25. The clock section 24 clocks the time. The automatic transfer control section 25, after an elapse of a predetermined time, as clocked in the clock section 24, while the current measured value or the total measured value indicated in said regular display section 19 being held unchanged, controls the transfer operation to be executed, as similarly to the above case where the manual transfer switch being turned on, so that the currently measured value or the total measured value indicated in the regular display section 19 may be transferred to and indicated in the memory display section 20 as the previously measured value in a series of consecutive measurements. With such a configuration, the measured value can be transferred into the memory display section without any trouble of executing operations by the person in measuring.

As having been described above, since a scale equipped with a memory display function according to the present invention comprises a regular display section and a memory display section, therefore a measurement procedure can be carried out visually without causing the trouble of remembering in the brain or taking notes of measured values, thereby increasing the efficiency. Especially, by including a plurality of such memory display sections, the measuring work can be facilitated, thereby further increasing the working efficiency.

Advantageously, since a summing unit is provided, a person in charge of measuring work can recognize a total measured value without calculating by himself/herself, thereby providing a convenient way of measurement.

Further, since a transfer unit is provided, it is ensured that the measured value indicated in the memory display section represents a previously measured value in a series of consecutive measurements, thereby facilitating an easy recognition of the measured value with fewer errors. Especially, since the transfer unit is constitutive of a manual transfer switch and a manual transfer control section, the current measuring work can be carried out while selecting only specific values required as the previously measured values in a series of consecutive measurements among those measured current measured value and total measured value, thereby facilitating a convenient use of the scale. Alternatively, since the transfer unit may be constitutive of a clock section and an automatic transfer control section, the person in charge of measurement work has no more need to take the trouble of executing the operation but the measured value can be transferred into the memory display section automatically, thereby reducing an effort in measuring work.

Also, since the regular display section, after the measured value having been transferred by the transfer unit, indicates a tared value, therefore an additional object to be measured can be placed on the loading table without unloading a previously measured object from the loading table, thus to obtain the measured value of this added object to be measured without any trouble yet in a continuous manner.

Further, since if the regular display section indicates either one of "0" or "a negative value", the transfer unit would not execute any transfer operation of the value into the memory display section, therefore it is ensured that the measured value acquired only when the object to be measured is actually placed on the loading table can be transferred into the memory display section, thereby preventing a wrong operation.

Further, since a tare subtraction unit is provided, a series of consecutive measurements can be carried out while eliminating those measured values that are not required to be transferred to the memory display section, thereby providing an improved usability. Still advantageously, a series of consecutive measurements can be carried out without adding the object to be measured onto the loading table in sequence, and so a plenty of objects can be handled.

What is claimed is:

1. A scale equipped with a memory display function, comprising:
   a regular display section for indicating a current measured value; a memory display section for indicating a previously measured value in an incremental measurement; and a transfer unit, wherein said transfer unit transfers the current measured value indicated in said regular display section such that the current measured value is indicated in said memory display section as the previously measured value in the incremental measurement, and said regular display section indicates "0" representing a tare subtracted value, instead of the current measured value, after the current measured value has been transferred to the memory display section as the previously measured value in the incremental measurement by said transfer unit.

2. A scale equipped with a memory display function in accordance with claim 1, further comprising:
   a summing unit, wherein said summing unit determines a total measured value from the current measured value indicated in said regular display section and the previously measured value in the incremental measurement as indicated in said memory display section, said regular display section indicates the total measured value determined by said summing unit instead of the current measured value and indicates "0" representing a tare subtracted value, instead of the total measured value, after the total measured value has been transferred as the previously measured value in the incremental measurement by said transfer unit, and said transfer unit transfers the total measured value indicated in said regular display section so that the total measured value can be indicated in said memory display section as the previously measured value in the incremental measurement.

3. A scale equipped with a memory display function in accordance with claim 1, further comprising a tare subtraction unit, wherein said tare subtraction unit subtracts a weight equivalent to a tare from a current measured value indicated in said regular display section, after the current measured value is indicated by said regular display unit and before the current measured value indicated in said regular display unit is initiated to be transferred so that the current measured value can be indicated in said memory display section as the previously measured value in the incremental measurement.

4. A scale equipped with a memory display function in accordance with claim 2, further comprising a tare subtraction unit, wherein said tare subtraction unit subtracts a weight equivalent to a tare from a current measured value indicated in said regular display section, after the current measured value is indicated by said regular display unit and before the current measured value indicated in said regular display unit is initiated to be transferred so that the current measured value can be indicated in said memory display section as the previously measured value in the incremental measurement.

5. A scale equipped with a memory display function in accordance with claim 4 further comprising a tare subtraction unit, wherein said tare subtraction unit subtracts a weight equivalent to a tare from a total measured value indicated in said regular display section, after the total measured value is indicated by said regular display unit and before the total measured value indicated in said regular display unit is initiated to be transferred so that the total measured value can be indicated in said memory display section as the previously measured value in the incremental measurement.

6. A scale equipped with a memory display function in accordance with claim 1, comprising a plurality of said memory display sections, each having a size smaller than that of said regular display section.

7. A scale equipped with a memory display function in accordance with claim 2, comprising a plurality of said memory display sections, each having a size smaller than that of said regular display section.

8. A scale equipped with a memory display function in accordance with claim 3, comprising a plurality of said memory display sections, each having a size smaller than that of said regular display section.

9. A scale equipped with a memory display function in accordance with claim 4, comprising a plurality of said memory display sections, each having a size smaller than that of said regular display section.

10. A scale equipped with a memory display function in accordance with claim 5, comprising a plurality of said memory display sections, each having a sizes smaller than that of said regular display section.

11. A scale equipped with a memory display function in accordance with claim 1, in which said transfer unit comprises: a manual transfer switch for a manual input upon executing a transfer operation; and a manual transfer control section which, in response to an input to said manual transfer switch, controls the transfer operation to be executed so that a measured value indicated in said regular display section may be indicated in said memory display section as a previously measured value in an incremental measurement.

12. A scale equipped with a memory display function in accordance with claim 2, in which said transfer unit comprises: a manual transfer switch for a manual input upon executing a transfer operation; and a manual transfer control section which, in response to an input to said manual transfer switch, controls the transfer operation to be executed so that a measured value indicated in said regular display section may be indicated in said memory display section as a previously measured value in an incremental measurement.

13. A scale equipped with a memory display function in accordance with claim 1, in which said transfer unit comprises: a clock section for clocking the time; and an automatic transfer section which, after an elapse of a predetermined time, as clocked in said clock section, while the measured value indicated in said regular display section being held unchanged, controls the transfer operation to be executed so that a measured value indicated in said regular display section may be transferred to and indicated in said memory display section as a previously measured value in an incremental measurement.

14. A scale equipped with a memory display function in accordance with claim 2, in which said transfer unit comprises: a clock section for clocking the time; and an automatic transfer section which, after an elapse of a predetermined time, as clocked in said clock section, while the measured value indicated in said regular display section being held unchanged, controls the transfer operation to be executed so that a measured value indicated in said regular display section may be transferred to and indicated in said memory display section as a previously measured value in an incremental measurement.

* * * * *